(12) United States Patent
Robison et al.

(10) Patent No.: US 9,291,277 B2
(45) Date of Patent: Mar. 22, 2016

(54) PLUG HEAD ASSEMBLIES

(71) Applicants: Jeffrey C. Robison, Provo, UT (US); M. Robert Mock, Midway, UT (US); Frank Redd, Orem, UT (US)

(72) Inventors: Jeffrey C. Robison, Provo, UT (US); M. Robert Mock, Midway, UT (US); Frank Redd, Orem, UT (US)

(73) Assignee: CALDERA ENGINEERING, LC, Provo, UT (US)

( * ) Notice: Subject to any disclaimer, the term of this patent is extended or adjusted under 35 U.S.C. 154(b) by 430 days.

(21) Appl. No.: 13/739,177

(22) Filed: Jan. 11, 2013

(65) Prior Publication Data

US 2013/0181154 A1 Jul. 18, 2013

Related U.S. Application Data

(60) Provisional application No. 61/586,523, filed on Jan. 13, 2012.

(51) Int. Cl.
*F16K 25/00* (2006.01)
*F16K 27/00* (2006.01)
*F16K 5/08* (2006.01)
*F16K 99/00* (2006.01)
*F16K 1/38* (2006.01)
*F16K 1/42* (2006.01)

(52) U.S. Cl.
CPC . *F16K 27/00* (2013.01); *F16K 1/38* (2013.01); *F16K 1/42* (2013.01); *F16K 5/08* (2013.01); *F16K 25/005* (2013.01); *F16K 99/00* (2013.01); *Y10T 29/49405* (2015.01); *Y10T 137/0491* (2015.04); *Y10T 137/0519* (2015.04); *Y10T 137/6065* (2015.04); *Y10T 403/217* (2015.01)

(58) Field of Classification Search
CPC ........... F16K 1/38; F16K 1/385; F16K 99/00; F16K 25/005; F16K 27/00; F16K 1/42; F16K 5/08; Y10T 403/217; Y10T 137/0491; Y10T 137/6065; Y10T 137/0519; Y10T 29/49405
USPC .......... 251/318, 324, 356, 366–367; 29/890.124; 137/15.24
See application file for complete search history.

(56) References Cited

U.S. PATENT DOCUMENTS

| | | | |
|---|---|---|---|
| 3,572,633 A | 3/1971 | Gaffney | |
| 4,401,264 A | 8/1983 | Williams et al. | |
| 4,575,047 A | 3/1986 | Boos et al. | |

(Continued)

OTHER PUBLICATIONS

Notice of Allowance dated Oct. 9, 2014 in U.S. Appl. No. 13/739,194.
Examination Report dated Apr. 27, 2015 in Australian Application No. 2013200141.
Examination Report dated Nov. 28, 2014 in Australian Application No. 2013200141.
Office Action dated Aug. 1, 2014 in U.S. Appl. No. 13/739,194.
Examination Report received in Australian Application No. 2013200141 dated Sep. 1, 2014.

*Primary Examiner* — Marina Tietjen
(74) *Attorney, Agent, or Firm* — Snell & Wilmer L.L.P.

(57) ABSTRACT

In accordance with various embodiments, a plug head assembly is provided comprising a ceramic plug head having a frustroconical geometry, wherein the ceramic plug head has a proximal terminus and a distal terminus, wherein the ceramic plug head has a first coefficient of thermal expansion (CTE), a sleeve having a frustroconical geometry conforming to the ceramic plug head and a second CTE, wherein the second CTE is greater than the first CTE, a distal retainer having a frustroconical geometry conforming to the sleeve, the distal retainer having a first engagement portion for engaging the a proximal retainer, the proximal retainer having a second engagement portion for engaging the distal retainer, and a base that couples with the proximal retainer. In addition, thick banded plug heads are provided.

10 Claims, 11 Drawing Sheets

(56) References Cited

U.S. PATENT DOCUMENTS

| | | |
|---|---|---|
| 4,747,722 A | 5/1988 | Kawaguchi et al. |
| 6,793,198 B2 | 9/2004 | Robison et al. |
| 7,255,538 B2 * | 8/2007 | Shi .................... F01D 5/026 403/29 |
| 8,500,093 B2 | 8/2013 | Haines et al. |
| 2007/0040136 A1 | 2/2007 | Caprera |
| 2008/0011975 A1 * | 1/2008 | Robison ................ F16K 25/005 251/366 |
| 2009/0159133 A1 * | 6/2009 | Popke .................... F16K 25/005 137/14 |
| 2010/0140530 A1 * | 6/2010 | Robison .................... F16K 1/38 251/368 |

* cited by examiner

PLUG HEAD ASSEMBLIES

CROSS REFERENCE TO RELATED APPLICATIONS

This application is a nonprovisional application of and claims priority to U.S. Provisional Patent Application Ser. No. 61/586,523 entitled, "PLUG HEAD ASSEMBLIES" and filed on Jan. 13, 2012. The '523 application is hereby incorporated by reference in its entirety. U.S. Patent Application No. 13/739,134 entitled "PLUG HEAD ASSEMBLIES" and filed on Jan. 11, 2013 is incorporated herein by reference in its entirety.

BACKGROUND OF THE INVENTION

In valve assemblies, fluid flow is controlled by actuating a plug head assembly relative to a valve seat, in extreme operating environments, such as at elevated temperatures, pressures and/or corrosive or abrasive fluids, the components of a plug head assembly may weaken or become more loosely coupled than intended. For example, where a ceramic plug head is retained by a conventional retainer apparatus, the retainer apparatus may expand at a higher rate than the ceramic plug head, thus making the fit between the retainer apparatus and the ceramic plug head loose. In addition, thermal events and crushing lodged solids may cause fractures in a ceramic plug head, which may then separate from the plug head assembly or compromise the integrity of the plug head ceramic.

Ceramic plug heads, such as plug heads comprised of sintered silicon carbide (SSiC), are often used in extreme operating environments, such as high-temperature applications (e.g., from about 20° C. to about 260° C.), and/or high-pressure applications (e.g., from about 5 bar to about 47 bar), and/or applications involving highly erosive and/or corrosive fluids and/or slurries. Slurries contain both solids and fluids, which may flow at high speeds. Thus, solid particles traveling at high speeds also comprise an extreme operating environment. While ceramics like SSiC are suitable for use in extreme operating environments, such ceramics are typically brittle and susceptible to fracture/damage from environmental conditions (e.g., thermal shock) and events (erosion/corrosion/collision/crushing).

Thus, it is desirable to overcome at least a portion of these and other related limitations associated with plug head assemblies.

SUMMARY OF THE INVENTION

In accordance with various embodiments, a plug head assembly is provided comprising a ceramic plug head having a frustroconical geometry, wherein the ceramic plug head has a proximal terminus and a distal terminus, wherein the ceramic plug head has a first coefficient of thermal expansion (CTE), a sleeve having a frustroconical geometry conforming to the sides of the ceramic plug head and a second CTE, wherein the second CTE is greater than the first CTE, a distal retainer having a frustroconical geometry conforming to the sides of the sleeve, the distal retainer having a first engagement portion for engaging a proximal retainer, the proximal retainer having a second engagement portion for engaging the distal retainer, and a base that receives the proximal retainer.

In accordance with various embodiments, a plug head assembly having a proximal terminus and a distal terminus is provided comprising a frustroconical ceramic plug head, the ceramic plug head having a larger diameter at a proximal face than at a distal face and a first tapered circumference, a sleeve, the sleeve having a second tapered circumference in substantial contact with at least a portion of the first tapered circumference, a distal retainer having a first engagement portion and a tapered interior surface, the tapered interior surface in substantial contact with the second tapered circumference, and a proximal retainer engaged with the distal retainer at the first engagement portion.

In accordance with various embodiments, a plug head assembly is provided comprising a flat ceramic plug head having a circumference and a thick band disposed about the circumference of the flat ceramic plug head, wherein the thick band exerts a radial stress upon the flat ceramic plug head at a room temperature and at an operating temperature.

In accordance with various embodiments, a valve seat assembly is provided comprising a ceramic valve seat having a circumference, and a thick band disposed about the circumference of the ceramic valve seat, wherein the thick band exerts a radial stress upon the ceramic valve seat at a room temperature and at an operating temperature.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

Figure 1:
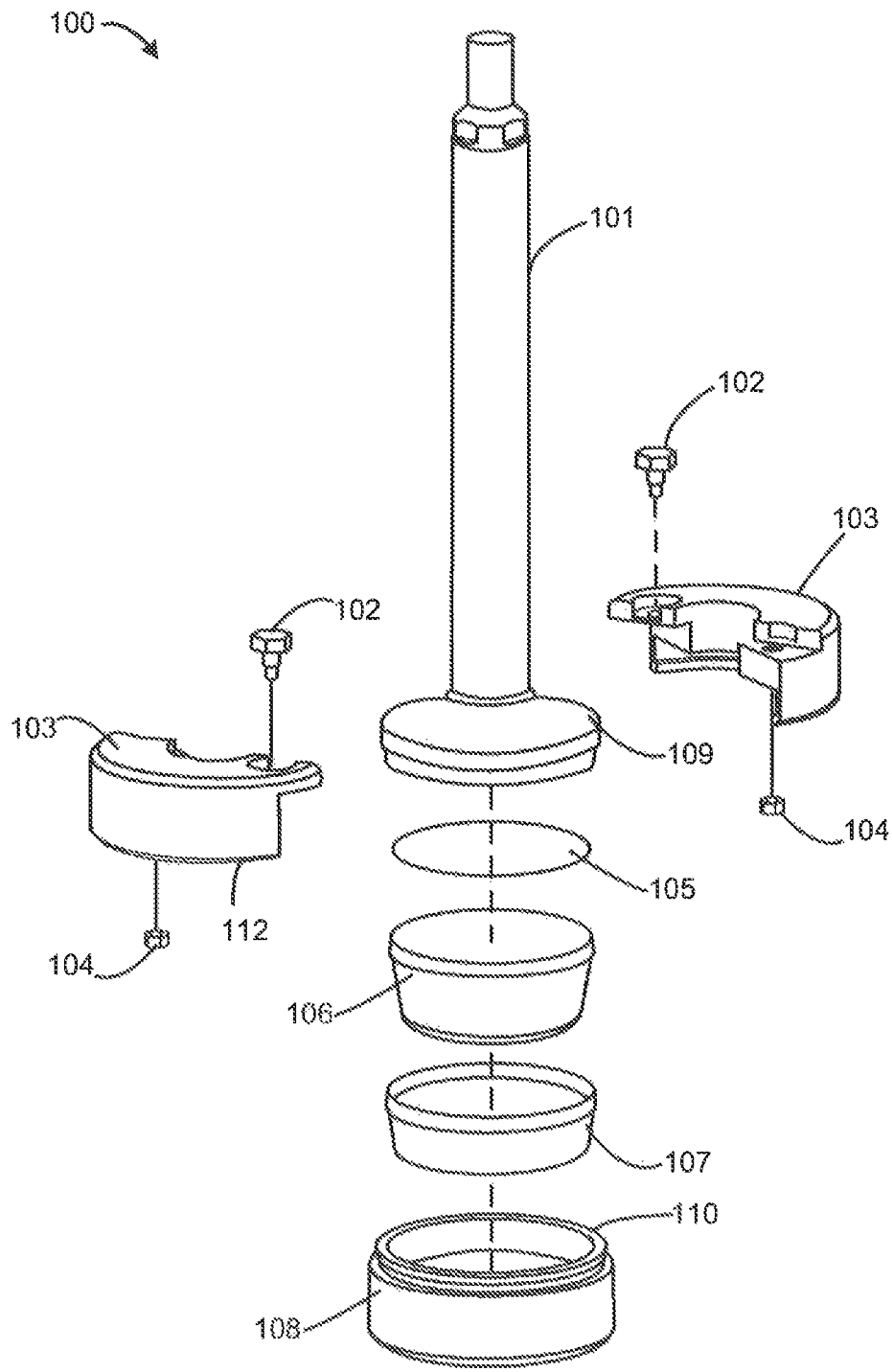
FIG. 1 illustrates an exemplary plug head assembly.

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A plug head assembly that is resistant to extreme operating environments, such as high temperatures and pressures is desirable. Valve assemblies that regulate the flow of abrasive or corrosive fluids are often comprised of a ceramic component. Ceramic components often have low coefficients of thermal expansion (CTE) and thus expand more slowly than many metals when temperature is increased. Thus, conventional ceramic plug head assemblies that comprise ceramic and metal tend to fail as temperature increases. For example, when a ceramic plug head retained in a metal housing is subjected to rising temperatures, the metal often expands faster than the plug head, leading to failure by separation of the plug head from its retaining housing.

In contrast, in various embodiments, a plug head assembly is provided that tends to resist failure in high temperature operating environments. In various embodiments, materials are selected based upon CTE value. In such a manner, the component having a larger CTE value may be selected to exert force on another component, thus increasing, not diminishing, the plug head assembly retention three. Moreover, the use of tapered circumferences tends to provide a plug head that resists separation from the plug head assembly.

In various embodiments, plug head assemblies are configured to have a suitable level of radial compressive stress. The present inventors have created such ceramic plug head assemblies to protect ceramic plug heads from tensile stresses and thermal shocks, for example. In addition, radial compressive stress may be used in a valve seat to provide protection from tensile stresses and thermal shocks, for example, as described herein, a plug head may selectively fit in a valve seat to control the flow of various fluids and fluid/solids mixtures.

As used herein, a room temperature may refer to temperatures generally found to he comfortable for use in homes, offices, and other structures. Room temperature may refer to, for example, temperatures from 60° F. to 90° F., from 65° F. to 85° F., from 70° F. to 80° F., and from 75° F. to 78° F. In various embodiments, room temperature may refer to 75° F. and room temperature may refer to 25° C.

As used herein, an operating temperature may refer to temperatures above room temperature. An operating temperature may be a temperature generally found when using a performing various industrial processes, for example, in the autoclave processing of refractory ores in the mining industry. An operating temperature may refer to, for example, temperatures from 120° F. to 1000° F., from 150° F. to 600° F., from 150° F. to 900° F., and from 150° F. to 400° F.

With regard to plug head geometry, a plug head may protrude into a valve seat when the valve is closed, such as the case with a parabolic plug head. As the valve opens, the plug head tip is extracted from the seat and the annular opening between plug head and seat increases. The profile of the plug determines the relationship of plug head position and flow area and thus the relationship of plug head position and flow. A long tip tends to have a low flow gain, resulting in a small slope of position vs. flow curve. A parabolic plug profile yields a linear position vs. flow relationship.

Figure 2:
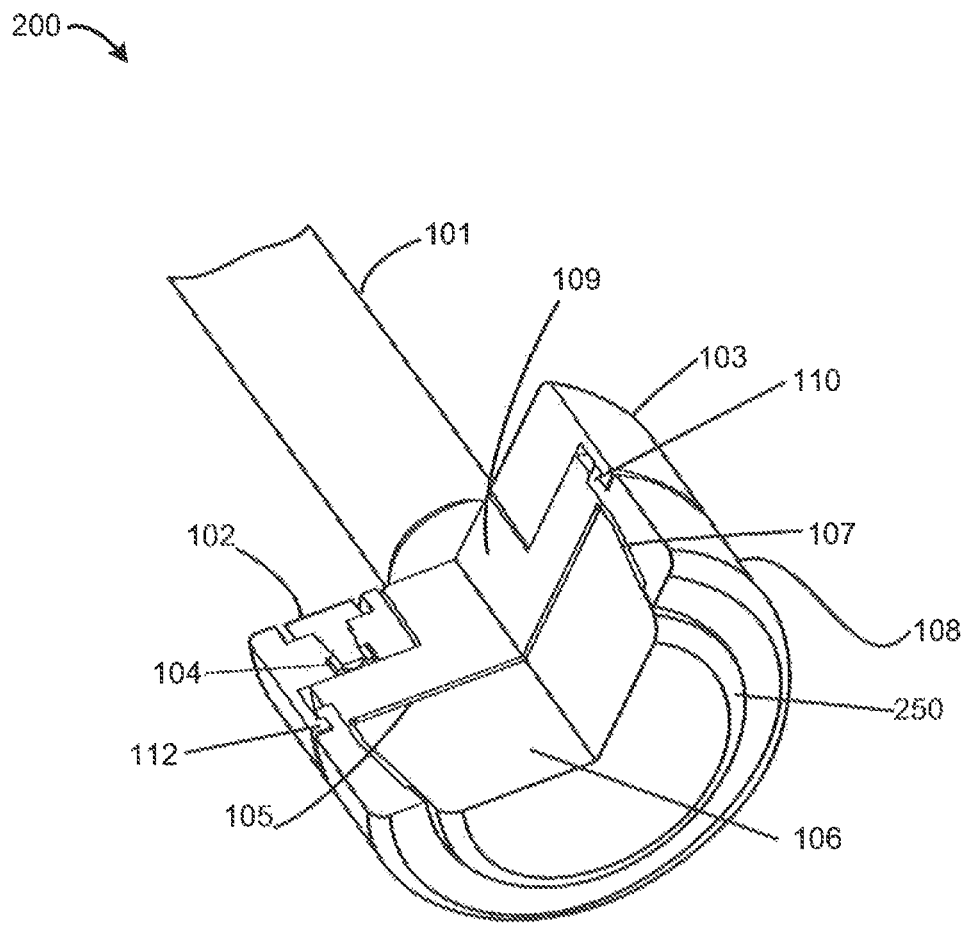
FIG. 2 illustrates the exemplary plug head assembly of FIG. 1 as assembled.
Figure 4A:
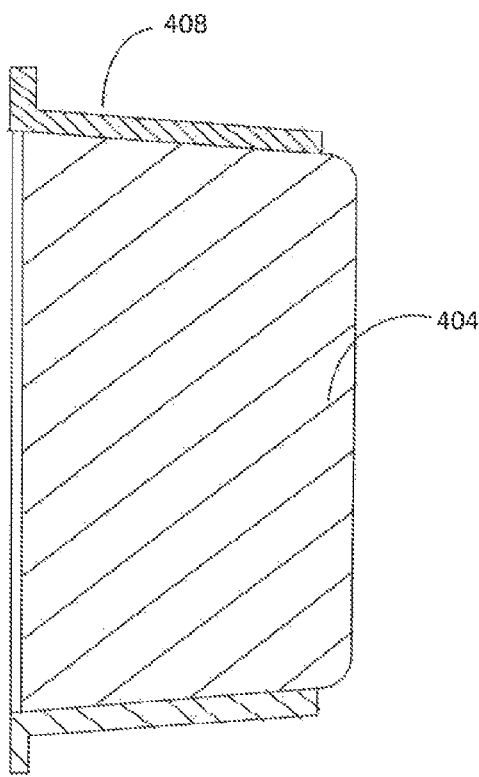
FIGS. 4A and 4B illustrate plug heads in accordance with various embodiments.
Figure 4B:
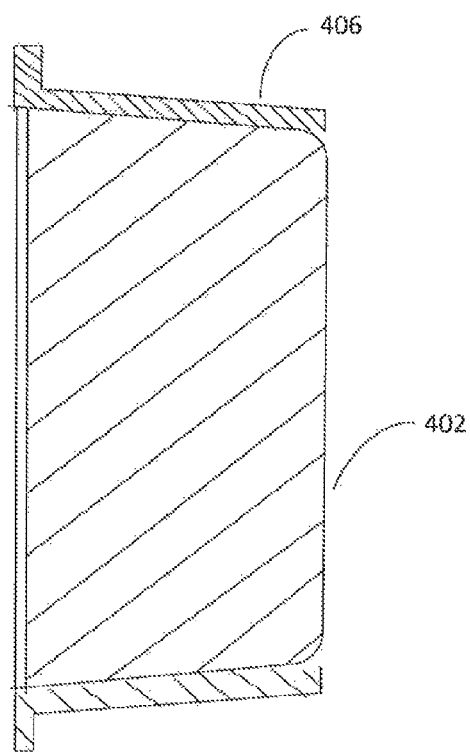

With reference to FIG. 4, a flat plug head and a stubby plug head are shown. Plug head 402 is a flat plug head. In an exemplary embodiment, plug head 402 does not extend axially past sleeve 406. Plug head 404 is a stubby plug head. Plug head 404 is shown to extend axially past sleeve 408. A plug head, as illustrated in FIGS. 1 and 2, may be flat or stubby, such as is shown in plug head 402 and plug head 404.

A substantially flat plug head tends to have high flow gain. High flow gain results in increased sensitivity to valve position error and possible undesirable valve or system dynamics. Valve position error can be reduced by using stiff actuation (e.g. electromechanical, electrohydraulic or hydraulic), appropriate control system position feedback, and/or appropriate integral feedback. Each of these, used properly, may add to actuation accuracy so that the adverse effect of the flat plug face high flow gain on accuracy can be mitigated.

Currently, flat plug heads have not been used frequently in autoclave slurry processes because of such high flow gain. However, recent tests of a flat plug head have shown that the flow gain over a portion of the plug stroke is lower than predicted from the calculated flow area. Correspondingly, the flow vs. position curve over the full range of operation is significantly nonlinear. In an example embodiment, the disadvantages derived from this nonlinearity can be largely mitigated by a linearity compensating algorithm in the actuator control system. In certain applications, the nominal valve operating range can be matched to the truncated region of lower flow gain.

Figure 6:
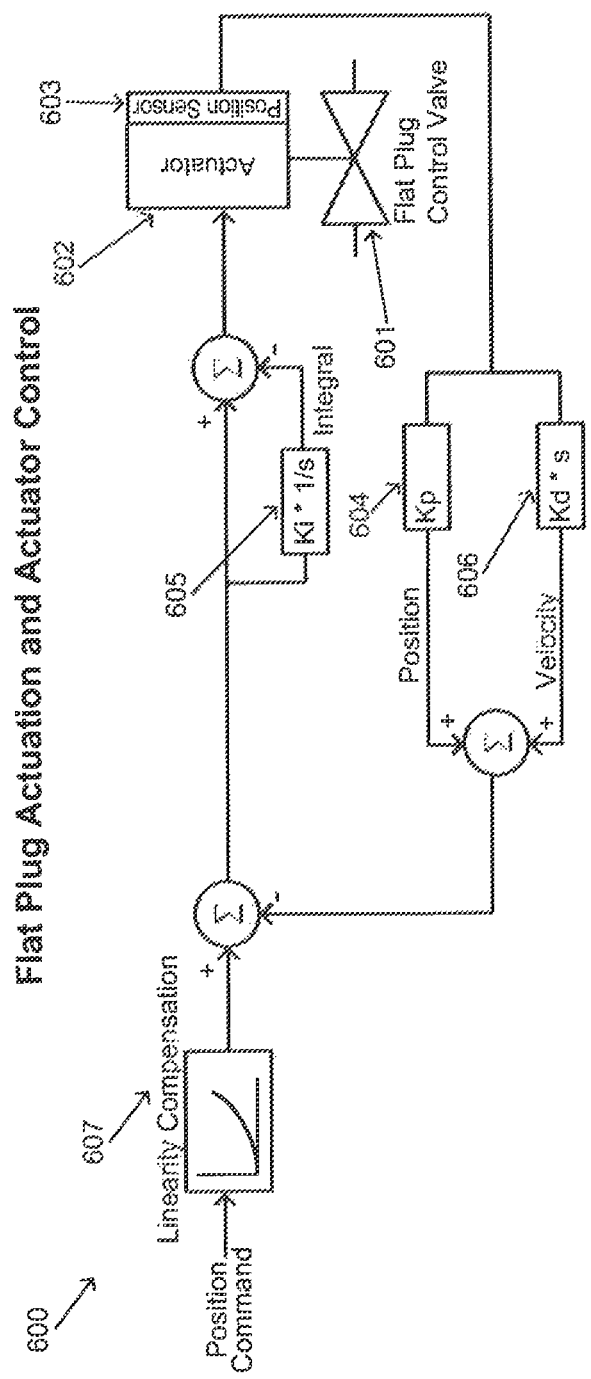
FIG. 6 illustrates an actuation control method in accordance with various embodiments.

Conventionally, flat or stubby plug faces were typically not used in autoclave slurry processes of the flash tank let down valve or autoclave steam vent valve because of the inaccuracies and low resolution associated with the flat face high flow gain. In various embodiments, a combined actuator, actuator control system and flat faced or stubby plug used in combination tends to take advantage of the flat faced plug strengths while mitigating the disadvantages of the high flow gain weakness. Thus the combination can achieve the flow control performance of conventional systems and take advantage of the benefits of the flat faced plug. Referring to FIG. 6, an exemplary actuation system 600 is illustrated. Actuation system 600 can comprise, for example, a flat plug control valve 601, actuator 602, and a position sensor 603. Flat plug control valve 601 comprises a plug with a substantially flat face. Actuator 602 is a stiff actuator, such as, for example, a hydraulic, electrohydraulic, or electromechanical actuator. The stiff actuation provided by actuator 602 is configured, in an example embodiment, to increase plug positioning accuracy. Position sensor 603 provides a position signal that may be multiplied by position gain 604 to provide position feedback. The position feedback can be used to increase the accuracy of the actuator position and thus increases the accuracy of the plug position. To compensate for the flow vs. plug position curve nonlinearity, in an example embodiment, linearity compensation 607 is applied by a controller to the command signal. Further, control feedback loop error may be reduced by inclusion of integral type control 605 that may further improve the accuracy of the actuator position by automatically adjusting, by integrating the position error signal. The velocity feedback, or derivative, signal may be generated from the position signal and used as a feedback signal to improve the dynamics of the valve and actuator control system. Each of the components of the flat faced plug control valve and actuation system described may improve but not all of them together would be required in every application.

There are several advantages to a substantially flat face plug design. Valve opening and closing can be accomplished more quickly due the shorter stroke of the valve. A conventional, parabolic plug tip extends into the seat as the valve closes. A solid fragment, for example, a piece of ore, scale or debris contained in a slurry flow, may become lodged and then crushed between the plug head and the seat as the valve closes. This would produce bending stress at the base of the plug head tip that may result in plug head fracture. The substantially flat face of the frustoconical plug head can be less vulnerable to this type of bending stress and the resultant damage.

A flat plug may seal against a flat seat to form a tight shutoff position. Thus, a flat plug head may both modulate flow and block the flow. As used herein, "flat" may mean completely or substantially flat. A flat seat may be used in conjunction with the flat plug. The flow pattern of a flat plug head impinges on itself in the center of the seat as the flow passes the plug head instead of impinging on the plug head thus avoiding damaging plug head tip erosion.

In various embodiments, a plug head assembly comprises a plug head. The plug head may comprise a frustoconical geometry, substantially frustoconical geometry, or partial frustoconical geometry. Stated another way, the plug head may be send-cylindrical in that the plug head has a diameter at a proximal end that is larger than a diameter at a distal end. Such a configuration forms a tapered circumference around the plug head. The tapered circumference may be at any suitable angle relative to the axis of the plug head. The angle of the taper may be from about 1 degree to about 50 degrees, from about 2 degrees to about 40 degrees, or from about 4 degrees to about 45 degrees. A partial frustoconical geometry plug head may comprise a portion that is cylindrical or substantially cylindrical and a portion that is frustoconical.

A plug head may comprise a ceramic material, such as silicon carbide (SiC) or more particularly sintered silicon carbide (SSiC). The plug head may be formed by sintering. A ceramic plug head may have a CTE of between about 3 and about 8 µm/m-° C. (nominally about 4 µm/m-° C.). Silicon carbide particles of a specified size distribution are combined with temporary hinder. This mixture of particles is compressed into a shape larger than, but approximating, the overall size required for the resulting plug head. This shape is baked to produce a "green" ceramic piece that may then be machined in that state then fired at high temperature to produce a completely fired ceramic of essentially only silicon carbide with essentially no secondary phase. In this state the plug head may be machined to the final dimensions. In various embodiments, a plug head may comprise tetragonally toughened zirconia ("TTZ"). Furthermore, the plug head can be formed of any suitable materials or using any suitable process.

In various embodiments, a sleeve comprises a frustoconical geometry, substantial frustoconical geometry, or a partially frustoconical geometry. Stated another way, the sleeve may be semi-cylindrical in that the sleeve has a diameter at a proximal end that is larger than a diameter at a distal end. A partial frustoconical geometry plug head may comprise a portion that is cylindrical or substantially cylindrical and a portion that is frustoconical.

The sleeve is configured to conform to the tapered surface of the plug head. The sleeve may be placed coaxial to and over the plug head, for example by using an interference fit, such that an interior surface of the sleeve is in contact with at least a portion of the plug head and, in various embodiments, the interior surface of the sleeve is in contact with substantially all the tapered surface of the plug head. In various embodiments, the sleeve may be placed coaxial to and over the plug head, without using an interference fit, such that an interior surface of the sleeve is in contact with at least a portion of the plug head. Furthermore, a sleeve may comprise any suitable geometry. Preferably, the sleeve may comprise a geometry that conforms to a portion of a surface of a plug head.

The interface of the tapered surface of the plug head and the tapered surface of the sleeve tends to aid in retention of the plug head within the sleeve. Thus, should the plug head fracture, the fractured pieces are more likely to be retained within the sleeve through the tapered surface geometry. In addition, the sleeve may be configured to exert a compressive stress on the plug head. For example, a sleeve may be configured to exert a compressive stress on the plug head in embodiments in which a metal sleeve is assembled to the plug head with an interference fit. Though in various embodiments such compressive stress is low, for example in embodiments having a sleeve comprised of plastic.

A sleeve may comprise a plastic material. Various suitable plastics include fluoropolymers such as polytetrafluoroethylene (PTFE). In various embodiments, a sleeve may comprise a material, such as a plastic, that has a CTE significantly higher than the difference between the CTE of a ceramic plug head and the CTE of a proximal and/or distal retainer. In such embodiments, the sleeve may also preferably be selected to be resistant to acidic environments, such as an environment comprising sulfuric acid. In addition, in such embodiments, the high CTE of the sleeve allows the sleeve to expand rapidly and fill or partially fill gaps that may be created between the plug head and the proximal and/or distal retainer. For example, in an embodiment having a PTFE sleeve, a SSiC plug head and a metal (e.g., titanium) proximal retainer and distal retainer, the high CTE of the PTFE sleeve may cause the sleeve to expand rapidly and till gaps created as the proximal retainer and distal retainer expand more rapidly than the plug head.

In various embodiments, a sleeve 107 may comprise a metal, for example, as illustrated in FIG. 1. It may be advantageous for a sleeve to comprise a soft metal. Soft metals comprise, for example, copper, aluminum, and lead. In various embodiments, the sleeve has a higher CTE than the plug head. For example, a sleeve may have a CTE of between about 4 µm/m-° C. and about 25 µm/m-° C. The relatively high CTE of the sleeve may, in conjunction with the CTE's of the plug head and other components, tend to produce a constant or increasing retaining stress resulting from the interference fit as ambient temperature increases.

In various embodiments, a sleeve may comprise a soft metal having a relatively high CTE, such as copper, aluminum, and lead. Use of a soft metal sleeve may be advantageous in embodiments used in high temperature environments that are also non-acidic.

In various embodiments, a distal retainer comprises a cylindrical outer shape and a frustoconical interior geometry. Stated another way, an interior surface of the distal retainer may be that of a truncated right circular cone in that the interior surface of the distal retainer has a diameter at a proximal end that is larger than a diameter at a distal end. The interior surface of the distal retainer is configured to conform to the tapered outer surface of the sleeve. The distal retainer may be placed coaxial to and over the plug head, for example by using an interference fit such that an interior surface of the sleeve is in contact with at least a portion of the plug head and, in various embodiments, the interior surface of the sleeve is in contact with substantially all the outer tapered surface of the plug head. In various embodiments, the distal retainer has a lower CTE than the sleeve. A sleeve may have a CTE of between about 20 µm/m-° C. and about 200 µm/m-° C.

In various embodiments, a proximal retainer comprises a cylindrical geometry. A proximal retainer may comprise two components that may be coupled by one or more bolts. In various embodiments, the proximal retainer has a lower CTE than the sleeve but substantially the same, the same, or a lower CTE than the distal retainer. A proximal retainer may have a GTE of between about 4 µm/m-° C. and about 25 µm/m-° C.

Figure 7:
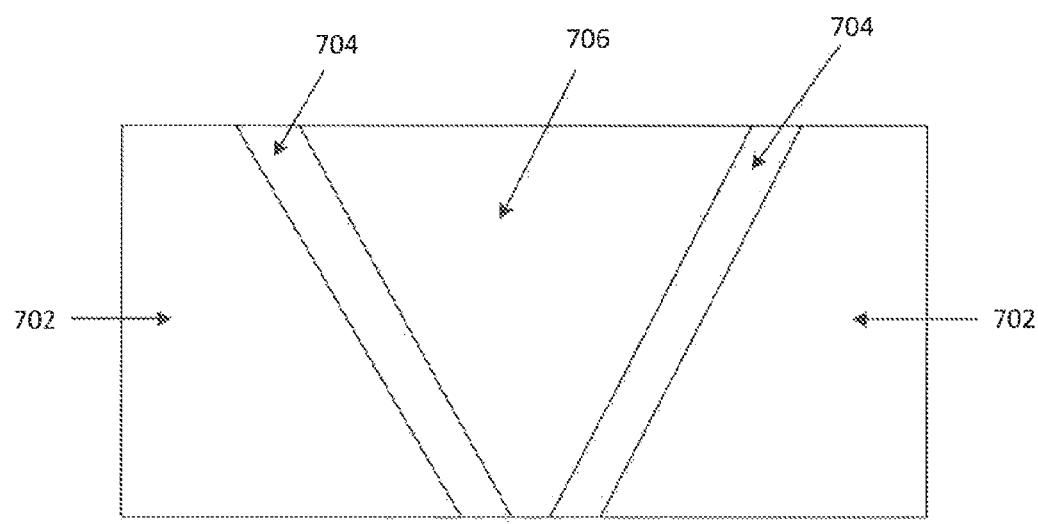
FIG. 7 illustrates an exemplary relationship of materials in accordance with various embodiments.

More generally, as shown in FIG. 7, a cross section of a sample plug head assembly is shown. Outer material 702 surrounds liner material 704 and inner material 706 is surrounded by liner material 704. At room temperature, the volume of liner material 704 equals the volume of the space. between the outer material 702, and inner material 706. In various embodiments, the relative CTEs of these materials may have the relationship: GTE of liner material 704>GTE of outer material 702>CTE of inner material 706. In various embodiments, the relative CTEs of these materials may have the relationship: CTE of liner material 704>CTE of inner material 706=GTE of outer material 702.

At an operating temperature, the amount of volume increase of liner material 704 may be selected to equal or exceed the volume increase of liner material 704 minus the volume of inner material 706 at the operating temperature. Stated another way, in various embodiments, at the operating temperature the volume increase of liner material 704=volume change of outer material 702 minus volume change of inner material 706. In various embodiments, at the operating temperature the volume increase of liner material 704>volume change of outer material 702 minus volume change of inner material 706.

The proximal retainer and the distal retainer may have engagement portions for engaging one another. For example, the proximal retainer may comprise a rabbet joint and the distal retainer may comprise a corresponding joint. By bringing two components of the proximal retainer together and engaging the distal retainer's engagement portion, the proximal retainer may act to retain the distal retainer onto the plug head assembly and to at least partially enclose the plug head.

A base may comprise any component configured to receive a plug head and other components. The base may comprise a stem that may move axially to operate the plug head assembly. Stated another way, distance traveled by the base in an axial direction may facilitate movement of the plug head.

During operation, as temperature increases, the sleeve may expand at a higher rate than the plug head, the distal retainer and the proximal retainer due to its high CTE. As temperature rises, the sleeve may expand in both an axial direction and a radial direction at a rate sufficient to continue to fill the increasing gap between the plug head and the distal retainer due to the difference in CTEs between the plug head and distal retainer. Thus, the grip between the distal retainer and the plug head are maintained or increased. In other words, the stress between the sleeve and plug head is maintained or increased. The tapered surfaces of the plug head, distal retainer, and sleeve also act to retain the plug head within the plug head assembly.

In various embodiments, a flat plug head is desired and little, for example, from about 0% to about 10% by length or from about 0% to about 25% by length, or no portion of the ceramic plug head extends to a point distal to the sleeve or the distal retainer. Such embodiments may result in a high flow gain characteristic, in that a flat plug head need only actuate a small axial distance to effectuate a change in the flow rate. In various embodiments, the ceramic plug head may comprise a portion that extends distal to the distal retainer. In such a configuration, the ceramic plug head provides a lower flow gain, as such a plug head needs to actuate a greater axial distance to effectuate a change in flow rate. Such embodiments, which may be referred to as a "stubby" plug head in that the distal point of the plug head extends little or not at all beyond the sleeve and/or the distal retainer. Such a configuration has the advantage that most of the ceramic is protected by the compressive stress from the sleeve.

One method of retaining plug heads comprises assembling a cylindrical band to the cylindrical base of a plug head with an interference fit. In various embodiments, by making the plug "stubby," as in FIG. 3, there is a shorter plug tip with corresponding lower flow forces pulling on the plug tip. Therefore, the required retention force is less and the plug band may be a thin band. Increasing the axial length of the band allows for an even thinner plug band since the increased length will compensate for the lower retention force per unit length that is sustained by the thinner band. The cost of large pieces of ceramic may be highly sensitive to final component size. In a "stubby" plug, the quantity of ceramic otherwise needed for the plug tip can be used to make a longer plug base without increasing the overall cost of the manufactured ceramic piece.

The "stubby" plug has lower potentially damaging shear stresses because the plug tip extends little beyond the metal sleeve. The thinner plug band further reduces those shear stresses. In addition, the plug band covers nearly the entire ceramic cylinder providing protective compressive stress to nearly all of the ceramic. Thick retention bands are typically tapered at either end of the band at about 45 degrees. In various embodiments, the taper in the thinned bands may range from about 5 degrees to about 30 degrees. The taper is configured to reduce the shear stress in the ceramic.

A frustoconical shaped plug mated to a correspondingly shaped metal sleeve produces higher retention forces because of the taper angle, than a similar cylindrical plug and sleeve. These higher retention forces would allow for a thin sleeve thickness resulting in correspondingly lower shear stresses in the ceramic.

With reference to FIG. 1, plug head assembly 100 is illustrated. Stem 101 is shown integral to base 109, though in various embodiments a stem and base are not integral. Proximal retainer 103 is shown as two components, though in various embodiments a proximal retainer may comprise a single component. The components of proximal retainer 103 may be joined by bolts 102 and nuts 104. Each half of proximal retainer 103 may be disposed coaxial or substantially coaxial to the base 109 and the bolts and nuts may be coupled. The engagement portion 110 of distal retainer 108, shown on a proximal portion of distal retainer 108, may be coupled with the engagement portion 112 of proximal retainer 103, as shown in detail in FIG. 2. In various embodiments, spacer 105 is disposed between base 109 and ceramic plug head 106. However, a spacer is not present in various embodiments.

Ceramic plug head 106 is shown having a tapered surface and frustoconical geometry. Sleeve 107, comprised of PTFE and/or a soft metal, is shown having a corresponding frustoconical geometry and a tapered surface. The ceramic plug head 106 and sleeve 107 may be fit within distal retainer 108. The interior surface of distal retainer 108 may conform to the outer surface of sleeve 107. Such an assembly is configured to reduce the probability that pieces from a fractured ceramic plug head would fall from the plug head assembly.

With reference to FIG. 2, an exemplary assembled plug head assembly 200 is shown. Bolt 102 may be engaged with nut 104 to retain the two components of proximal retainer 103 in a coupled state. In an exemplary embodiment, ceramic plug head 106 is coaxial with sleeve 107 and distal retainer 108. In an exemplary embodiment, proximal retainer 103 is engaged with distal retainer 108. Engagement portion 112 of proximal retainer 103 may be configured to engage engagement portion 110 of distal retainer 108.

Various engagement portion configurations are contemplated herein, such as mated threads (e.g., male and female screw threads), a dovetail joint, and a rabbet joint. A rabbet joint is illustrated in FIG. 2. In this exemplary embodiment, engagement portion 112 of proximal retainer 103 comprises an inset grasping portion that is configured to interlock with engagement portion 110 of distal retainer 108. Bolts 102 and nuts 103 are shown securing the proximal retainer 103 to the base 109.

Proximal retainer 103 may be configured to retain distal retainer 108 and, moreover, through contact on distal retainer 108's interior tapered surface, sleeve 107 and ceramic plug head 106 is retained within assembled plug head assembly 200.

In this exemplary embodiment, ceramic plug head 106 has a protrusion 250 that comprises a portion of ceramic plug head 106 that protrudes to a point distal to distal retainer 108. Such a protrusion may increase the axial distance needed to move the plug head from a fully open to a fully closed position. However, in various embodiments, ceramic plug head 106 does not protrude to a point distal to distal retainer 108. In such embodiments, more rapid on/oft functionality is achieved.

Figure 5:
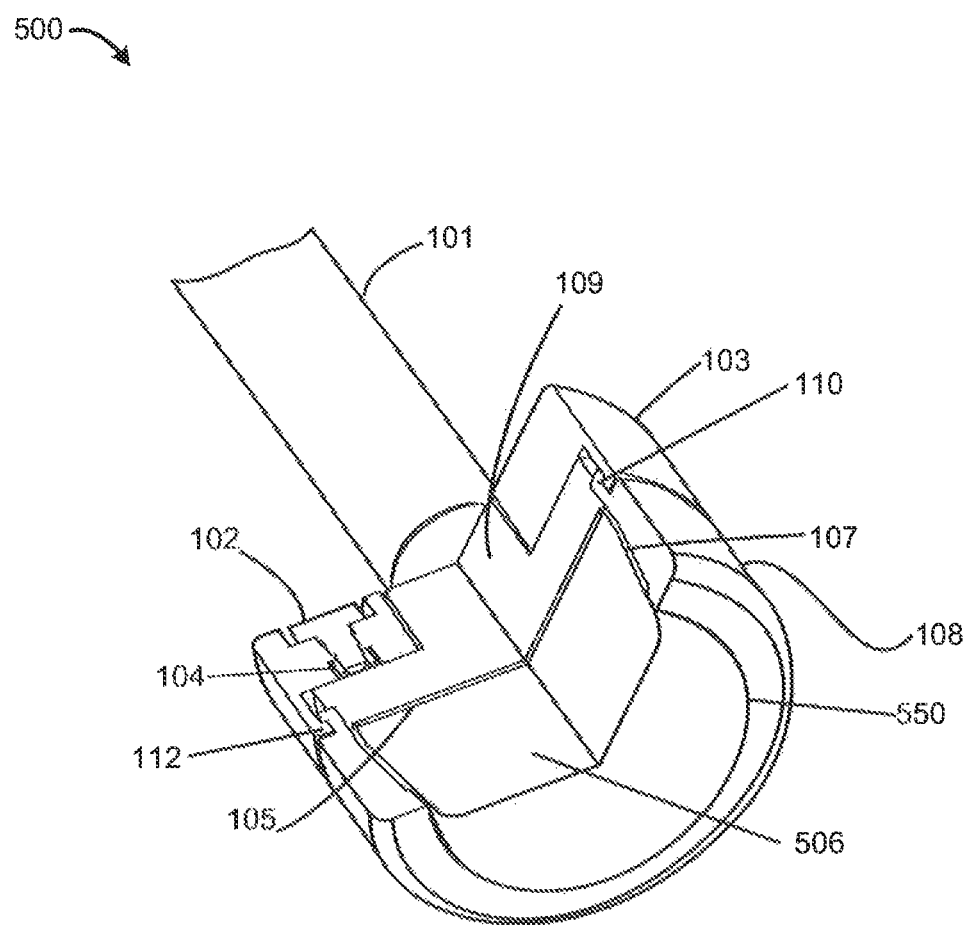
FIG. 5 illustrates an embodiment similar to FIG. 2 only having a flat plug head.

With momentary reference to FIG. 5, an example plug head assembly 500 is illustrated. Plug head assembly 500 is identical to that shown in FIG. 2, however, in place of ceramic plug head 106, which has a stubby profile, ceramic plug head 506 comprises a flat profile. As shown at point 550, the interface of ceramic plug head 506 with distal retainer 108 is substantially flush, in contrast to protrusion 250 shown in FIG. 2.

With reference back to FIGS. 1 and 2, sleeve 107 has a higher GTE than base 109, ceramic plug head 106, distal retainer 108 and proximal retainer 103. Similarly, the spacer 105 has a higher GTE than base 109, ceramic plug head 106, distal retainer 108 and proximal retainer 103. Spacer 105 is typically used to insulate and separate the plug head from the base. In various embodiments, spacer 105 comprises PTFE. Ceramic plug head 106 has a lower GTE than distal retainer 108 and proximal retainer 103. Base 109 may have a higher GTE than ceramic plug head 106. Thus, as assembled plug head assembly 200 is heated, sleeve 107 expands at a faster rate than the gap between the plug head 106 and the distal retainer 108 due to the difference in CTEs between the plug head 106 and distal retainer 108. Thus, the grip between the distal retainer 108 and the plug head 106 are maintained or increased. Moreover, expansion of spacer 105 may exert an axial force on ceramic plug head 106, increasing the retaining force between distal retainer 108, sleeve 107, and ceramic plug head 106, though in various embodiments, spacer 105 exerts no axial force or axial minimal force on ceramic plug head 106. Accordingly, in various embodiments, the loading of plug head 106 is a function of the CTE of plug head 106, the CTE of sleeve 107, the CTE of distal retainer 108, outside diameter of plug head 106, inside diameter of distal retainer 108, thickness of sleeve 107, and the respective angels of sleeve 107, plug head 106, and distal retainer 108.

In various embodiments, the material of plug base 109, distal retainer 103, and proximal retainer 108 is titanium grade 2 and has a CTE in the approximate range of about 8.7 to 10 μm/m-° C. The material of sleeve 107 may be PTFE and has a CTE in the approximate range about 57 to 170 μm/m-° C., in further embodiments, the material of sleeve 107 may be a soft metal and has a CTE in the approximate range about 16 to 40 μm/m-° C., Additionally, the material of plug head 106 is sintered alpha SiC and has a cm in the approximate range of 3.9 to 4.1 μm/m-° C. Moreover, plug head assembly 100 materials may include any suitable materials as would be known to one skilled in the art.

In various embodiments, a sleeve may be comprised of a soft metal. A soft metal sleeve may be configured to have a diameter less than that of a plug head. Such a soft metal sleeve may be heated to a diameter greater than that of a plug head, disposed coaxial or substantially coaxial to the plug head, and allowed to cool. Alternatively, the plug head may be press fit into the soft metal sleeve. The soft metal sleeve may thus provide compressive stress to the plug head. Higher compressive force by the soft metal sleeve on the plug head may produce correspondingly high shear stress under the metal sleeve edge that contributes to plug head fracture.

A metal sleeve having a tapered thickness may result in less radial stress to hold the plug head in place, with correspondingly less plug head shear stress. Preferably, a thin metal sleeve, or a metal sleeve with a thin portion, may be used to produce lower stresses.

Figure 3:
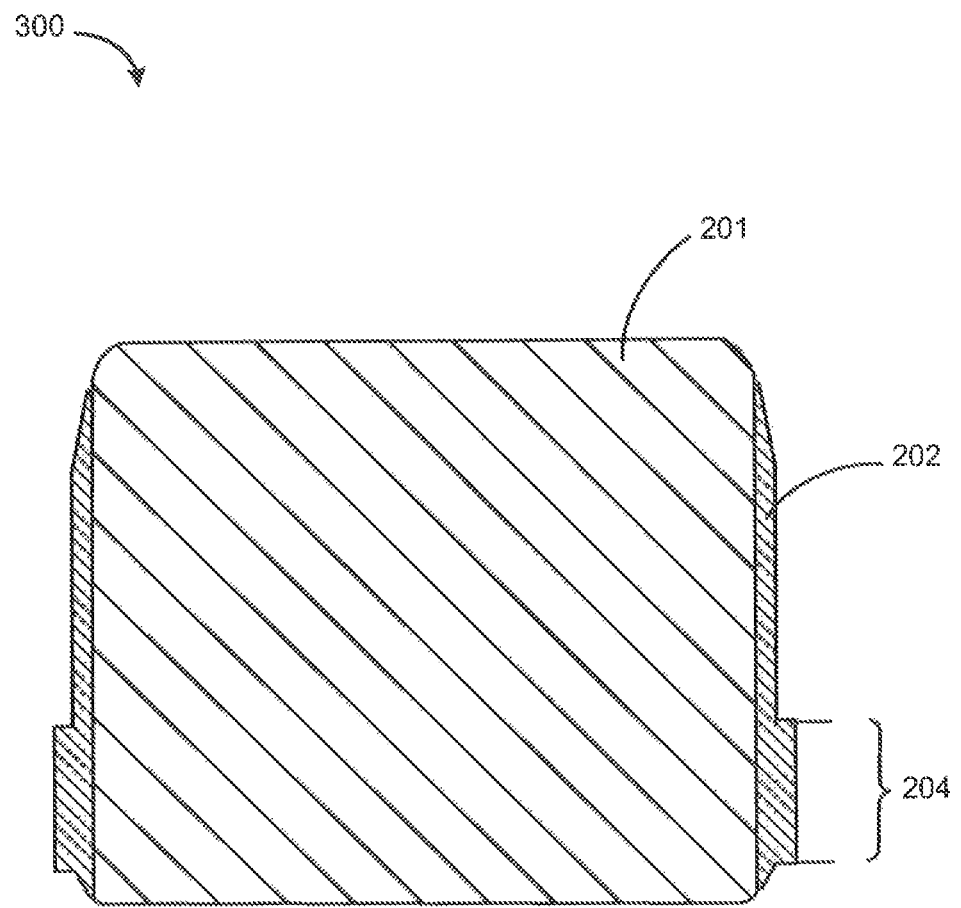
FIG. 3 illustrates another exemplary plug head assembly.

With reference to FIG. 3, plug head assembly 300 is shown. In an exemplary embodiment, plug head 201 is disposed coaxial to metal sleeve 202. Metal sleeve 202 may comprise a banded portion 204. Metal sleeve 202 may also comprise a portion that is thinner than banded portion 204. For example, as shown in FIG. 3, the portion of metal sleeve 202 distal to banded portion 204 is thinner than banded portion 204. Metal sleeve 202 may be used in various embodiments to create compressive stress on plug head 201. In various embodiments, metal sleeve 202 may be comprised of a metal that has a higher CTE than plug head 201. In such embodiments, at elevated temperatures, the metal sleeve will radially expand at a rate higher than the radial expansion of plug head 201, thus decreasing but not eliminating the compressive force on plug head 201. The banded portion 204 of sleeve 202 facilitates the attachment of plug head assembly 300 to a plug base using a retainer to retain the plug head to the plug base.

In accordance with various embodiments, tapered plug heads are not used. In such embodiments, cylindrical or substantially cylindrical plug heads may be used. Though the present disclosure references portions of a cylinder (e.g., radius, axis, etc), it should be understood that other geometries are contemplated herein.

The present inventors have created ceramic plug heads that may be protected from tensile stresses, for example those caused by impact or crushing with other objects and thermal shock, by the application of a radial compressive stress. Radial compressive stress thus tends to have a protective effect on ceramic plug heads.

In various embodiments, thick bands may be used to surround a plug head and apply a radial compressive stress. A thick band may be defined as a band of sufficient to exert a radial compressive stress of at least 400 psi at an operating temperature and in various embodiments at least 700 psi at an operating temperature. In various embodiments, a thick band may be configured to exert a radial compressive stress of between 800 psi and 8000 psi, between 1200 psi and 2500 psi, between 1200 psi and 7000 psi, between 1200 psi and 1800 psi, and greater than 1200 psi at an operating temperature.

In various embodiments, the amount of radial compressive stress desired depends upon the plug head material, thick band material, the size of the plug head and the geometry of the plug head. One approach to selecting a desired amount of radial compressive stress is to estimate the residual stress of a ceramic plug head. Due to manufacturing technique, size, shape, and purity, residual stresses in a ceramic plug head may vary. Once the residual stress of a ceramic plug head is approximated, a significant fraction of that residual stress may be selected to be the desired amount of radial compressive stress. For example, if it is estimated that a SiC flat plug head has a residual stress of 12,000 psi, 10% of that value (1200 psi) may provide the desired level of protection from tensile stress/thermal shock.

In addition, it has been observed catastrophic fractures of plugs and seats, particularly those used in autoclaves, occur at a tensile stress between 4000 psi to 8000 psi. Selecting a compressive stress that is a significant fraction of the potential fracture stress, for example, 800 psi is 10% of 8000 psi, can increase the probability of survival dramatically.

As described herein below, the axial elongation of a thick band that occurs at an operating temperature may resolve as a shear stress on the ceramic valve seat. In that regard, ceramic valve seats (e.g. SiC) may benefit from a radial compressive stress that is 10% to 20% of their residual stress. Flat ceramic plug heads (e.g. SiC) may be less susceptible to such shear stress, and thus flat ceramic plug heads may benefit from a radial compressive stress that is 10% to 40% of their residual stress.

The amount of radial compressive stress is not arbitrary. A relatively low amount of radial compressive stress may be beneficial to retain the ceramic plug head within the thick band at both room temperature and the operating temperature. In various embodiments the present inventors have created thick bands that exert amounts of radial compressive stress that tend to provide increased protection from tensile stress and thermal shock. Thus, low amounts of radial compressive stress, which are sufficient for retention purposes, may not provide the protection desired. Moreover, the present inventors have discovered that very high amounts of radial compressive stress may lead to failure of the thick band and/or an increased probability that a SiC plug head or seat will fracture due to shear stress or thermal elongation stresses. Thus, the amount of radial compressive stress may be selected and controlled in response to these competing factors. In various embodiments, the probability of survival of a thermal shock or tensile stress may be expressed as a function of radial compressive stress exerted. In various embodiments, the amount of radial compressive stress exerted by a thick band may be greater than is sufficient tor retention, equal to or greater than an amount that provides protection from thermal shock and tensile stress, and less than an amount that would decrease probability of survival of elongation stress of a SiC plug head or valve seat below an acceptable threshold. In various embodiments, the hoop stress of a metal thick band is less than the yield strength of the metal. Accordingly, in various embodiments, the amount of radial compressive stress is bounded by a significant fraction of the residual stress of a ceramic plug head or valve seat as described herein and by one or more of a selected probability of survival of elongation stress of a SiC plug head or valve seat and a hoop stress of a metal thick band relative to the yield strength of the metal.

In various embodiments, the thick band is comprised of metal. For example, the thick band may be comprised of titanium, zirconium, aluminum, steel, stainless steel, duplex steel, or super duplex steel.

Figure 8A:
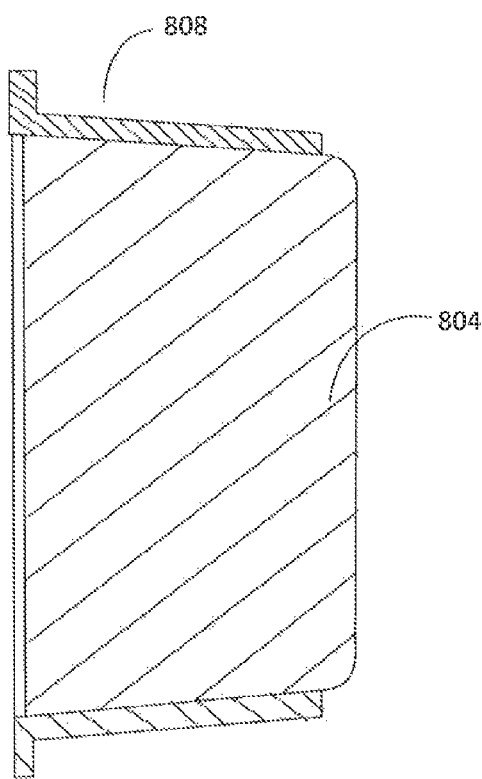
FIGS. 8A and 8B illustrate exemplary plug head assemblies in accordance with various embodiments.
Figure 8B:
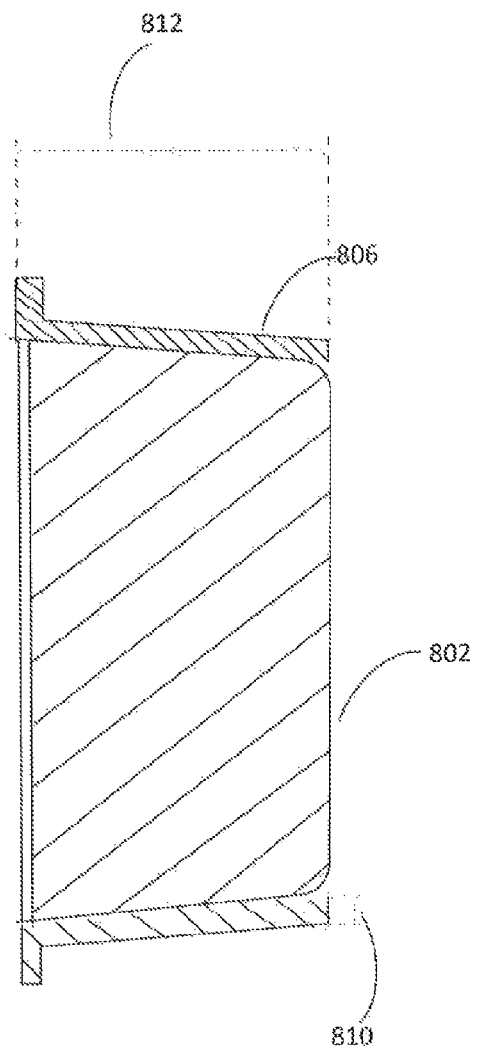

With reference to FIG. 8, a flat plug head and a stubby plug head, each surrounded by a thick band, are shown, in an example embodiment, plug head 802 is a flat plug head. In an example embodiment, plug head 802 does not extend axially past thick band 806. In another example embodiment, plug head 804 is a stubby plug head. In this embodiment, plug head 804 is configured to extend axially past thick band 808. In embodiments where the plug head extends axially past a thick band (whether at the room temperature or the operating temperature), such protrusion is kept to a minimal amount, as the radial compressive stress of the thick band may cause sheer stress along the protruded portion of the plug head. Such minimal amount may be represented as 10% or less of the outer diameter ("OD") of the ceramic plug head.

Thickness 810 represents the thickness of thick band 806. Axial length 812 represents the axial length of thick band 806. A thick band may be of a thickness of about 10% or more of the ceramic plug or seat OD and may be sufficiently thick so that the metal does not yield at room temperature and will produce a compressive stress preferably greater than 1200 psi at operating temperature.

A thick band may be placed around a ceramic plug head at an assembly temperature. Typically, the assembly temperature will be higher than the operating temperature. Prior to assembly, the inner diameter ("ID") of the thick band may be smaller than the outer diameter of the ceramic plug head. During assembly, the thick band may be heated and the ceramic plug head may remain at a room temperature or a temperature below the operating temperature. The heating will cause the thick band to expand, thus causing the ID of the thick band at the assembly temperature to be greater than the ID of the thick band at room temperature. The thick band may be heated to an assembly temperature great enough so that the ID of the thick band is greater than the OD of the ceramic plug head. The thick band may be disposed coaxial or substantially coaxial to the ceramic plug head. The thick band may cool and contract, thus applying a radial compressive stress on the ceramic plug head. In various embodiments, the thick band may be press fit on to the plug head.

In like manner, a ceramic valve seat may have a thick band to apply a radial compressive stress. Unlike a typically solid plug head, a valve seat may be hollow to allow material to flow through it. A valve seat may be cylindrical in nature on the exterior and interior. However in various embodiments the interior diameter of a valve seat will change as one travels along the axis of the valve seat. For example, a valve seat may have an "hourglass" configuration.

The radial stress at the interface of the ceramic plug head and the thick band may he represented by:

$$\sigma b_r(a, b, c, \delta) := \frac{\delta}{\frac{b}{E_{Ti}} \cdot \left(\frac{c^2 + b^2}{c^2 - b^2} + v_{Ti}\right) + \frac{b}{E_{SiC}} \cdot \left(\frac{b^2 + a^2}{b^2 - a^2} - v_{SiC}\right)}$$

Where a is the ID of the valve seat, b is the ID of the thick hand and c is the OD of the thick band.

Figure 9:
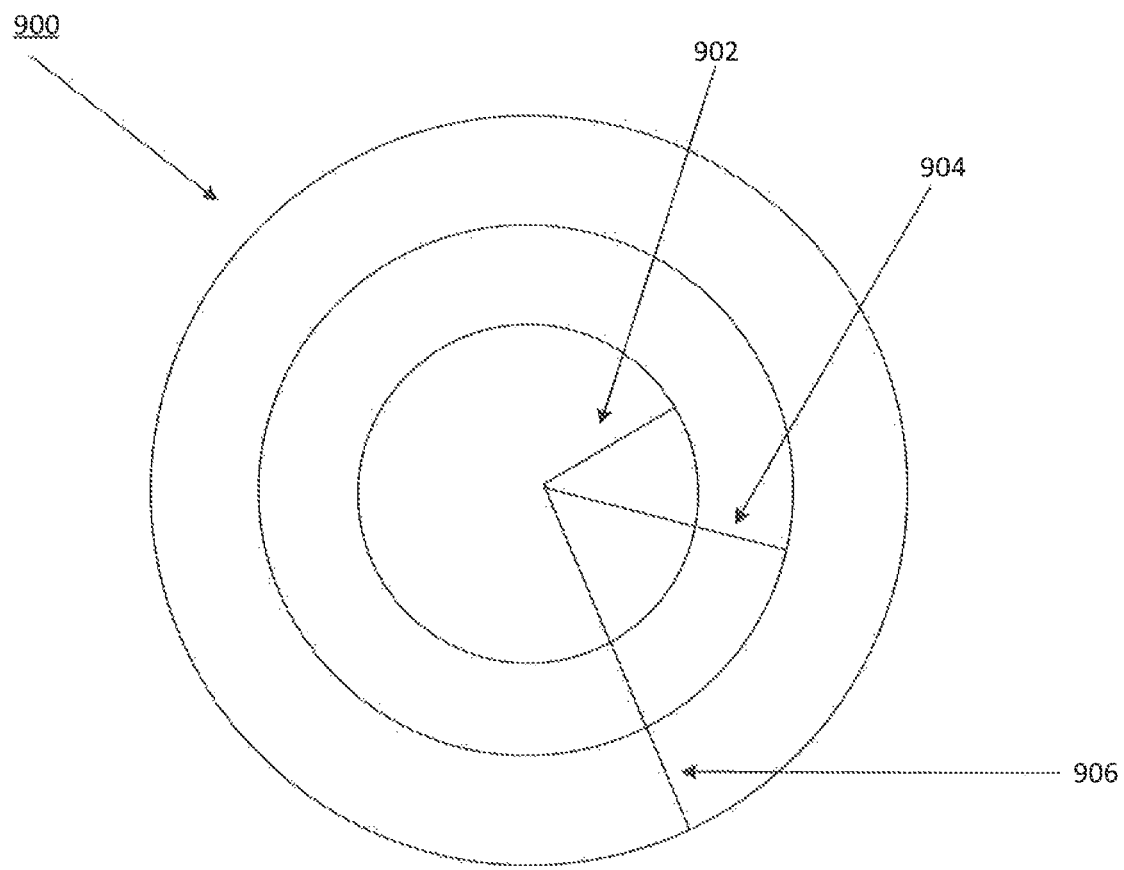
FIG. 9 illustrates radii of a thick band and a valve seat in accordance with various embodiments.

With reference to FIG. 9, radius 902 is the ID of the valve seat, radius 904 is the ID of the thick band, and radius 906 is the OD of the thick band.

The equation for hoop stress in the band is:

$$\sigma o_t(r, a, b, c, \delta) := \frac{\sigma b_r(a, b, c, \delta) \cdot b^2}{c^2 - b^2} \cdot \left(1 + \frac{c^2}{r^2}\right)$$

The maximum radial stress value tends to be at the ID of the thick hand (r=b). The thick band thickness and fit interference ($\delta$) at typical room temperature may be selected so that the maximum stress value is less than or equal to the yield strength ($\sigma_y$) of the hand metal.

Fit interference ($\delta$) varies with temperature according to the equation $$\delta_T(\Delta T) := \delta_0 - b \cdot (\alpha_{Ti} - \alpha_{SiC}) \cdot \Delta T$$

where $\delta_0$ is the interference at the room temperature and $\Delta T$ is the temperature difference from that room temperature. For Ti and SiC, the interference will decrease as the temperature rises.

Accordingly, the thick band thickness and interference $\delta_0$ at room temperature may be selected to adjust radial stress at the operating temperature. In various embodiments, as discussed above, it is advantageous to create a radial stress greater than 1200 psi where using a SiC plug head. In various embodiments, as discussed above, it is advantageous to create a radial stress greater than 2500 psi where using a SiC valve seat.

At an operating temperature, due to the temperature difference from room temperature, materials may elongate. This thermal elongation may introduce additional stress into the plug head system (ie, axial thermal expansion stress).

In a system having a Ti thick band a SiC plug head, thick band expands axially at a greater rate than the SiC ceramic plug and the seat, provided the seat is made of SiC. This thermal expansion results in an axial tensile stress in the SiC estimated by the equation $$\sigma_{SiC} = \frac{\Delta T \cdot (\alpha_{Ti} - \alpha_{SiC})}{\frac{E_{SiC} \cdot A_{SiC}}{E_{Ti} \cdot A_{Ti}} + 1} \cdot E_{SiC}$$

Such phenomenon may increase the probability of the ceramic plug head of fracturing. The probability of survival for the ceramic plug head subjected to this axial thermal expansion stress can be estimated by the following equation $$Prb(\sigma_{SiC}) = e^{-\frac{V_{SiC}}{V_0} \cdot (\frac{\sigma_{SiC}}{\sigma_a})^{m_a}}$$

where $V_{SiC}$ is the volume of the ceramic plug or seat, $V_0$ is the volume of the ceramic tests specimens used to determine the material properties, $\sigma_{SiC}$ is the stress applied to the ceramic plug or seat, $\sigma_a$ is the characteristic strength of the material accounting for any strength degradation, e.g. thermal shock degradation or that from surface erosion, and $m_a$ is the Weibull modulus of the material accounting for any material flaw redistribution resulting from events such as thermal shock or surface erosion.

In various embodiments, the thickness of the thick band is selected, and thus the thick band's cross sectional area ($A_{SiC}$), to assure an adequate calculated probability of survival from applied stress due to thermal elongation. In various embodiments, a survival probability of at least above 90%, above 95%, and above 99% is used.

In various embodiments, the valve seat has the same diameter as the plug head and, in various embodiments, the valve seat has a diameter that is nearly the same diameter as the plug head (e.g., within 5%). In operation, flowing particles will more likely be crushed at the OD of the valve seat where the compressive stresses from the thick band are higher.

Figure 10:
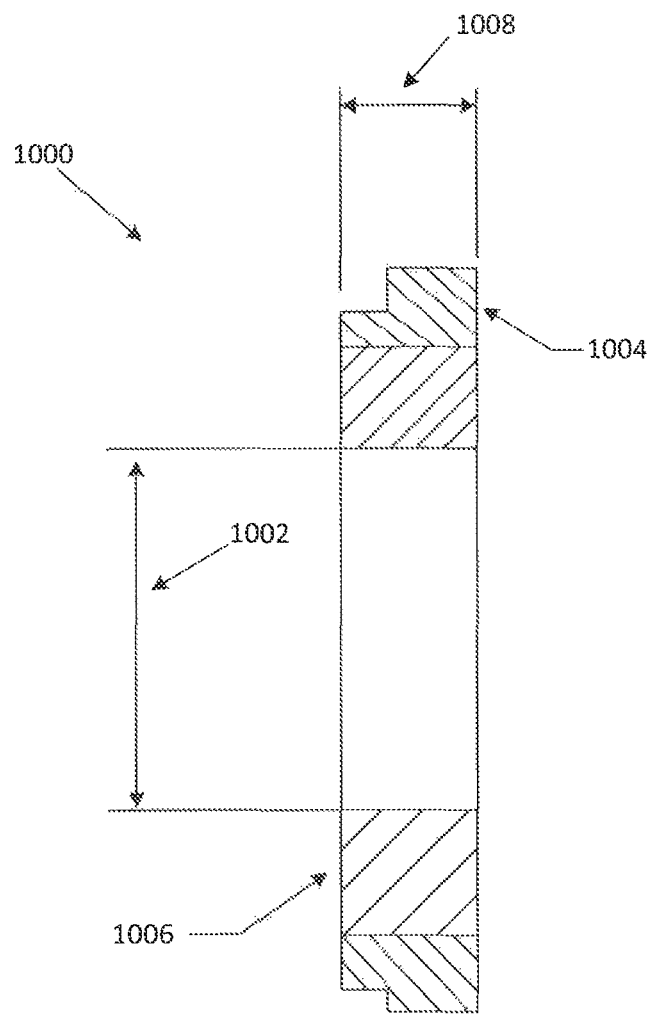
FIG. 10 illustrates a thick band and valve seat in accordance with various embodiments.

With reference to FIG. 10, a cross section of a valve seat is shown. Valve seat 1006 is surrounded by thick band 1004. Thick band 1004 and valve seat 1006 are flush at flush point 1010. Valve seat 1006 has ID 1002. Thick band 1004 has axial length 1008.

The estimated compressive radial stress in the seat varies from a maximum at the OD to zero at the ID according to the equation $$\sigma Seat_r = \frac{\sigma b_r \cdot b^2}{b^2 - a^2} \cdot \left(\frac{a^2}{r^2} - 1\right)$$

In various embodiments, the radial compressive stress at the OD of the valve seat is at least 1500 psi, though in various embodiments at least 2500 psi is used. In various embodiments, the width of this region of the valve seat is at least 25% of the inside radius of the seat. Maximum hoop stress at room temperature is selected to be less than the yield stress of the thick band metal, and the estimated probability of survival from axial thermal elongation is at least 90%, at least 95%, and/or at least 99% in various embodiments.

In various embodiments, the thick band is not tapered at a terminus. Thus, in various embodiments, the thick band and the plug end concurrently or nearly concurrently. This may reduce shear stress on the ceramic plug head. A blunt end on the thick band may be desirable to maintain the compressive radial stress at the terminus of the ceramic plug head.

A frustoconical shape in not required for the thick band, but various embodiments include such configuration, which has certain retention and assembly advantages. For example, in such embodiments, assembly may be accomplished without heating.

Valve assemblies in accordance with various embodiments also exhibit improved flexibility over conventional designs, such as parabolic valve assemblies. In that regard, where a change in the valve seat bore or interior geometry is desired, such change may be made without change to the plug head, provided that the plug head has a greater or equal diameter as the valve seat. Thus, the additional cost of another plug head assembly is avoided.

Figure 11:
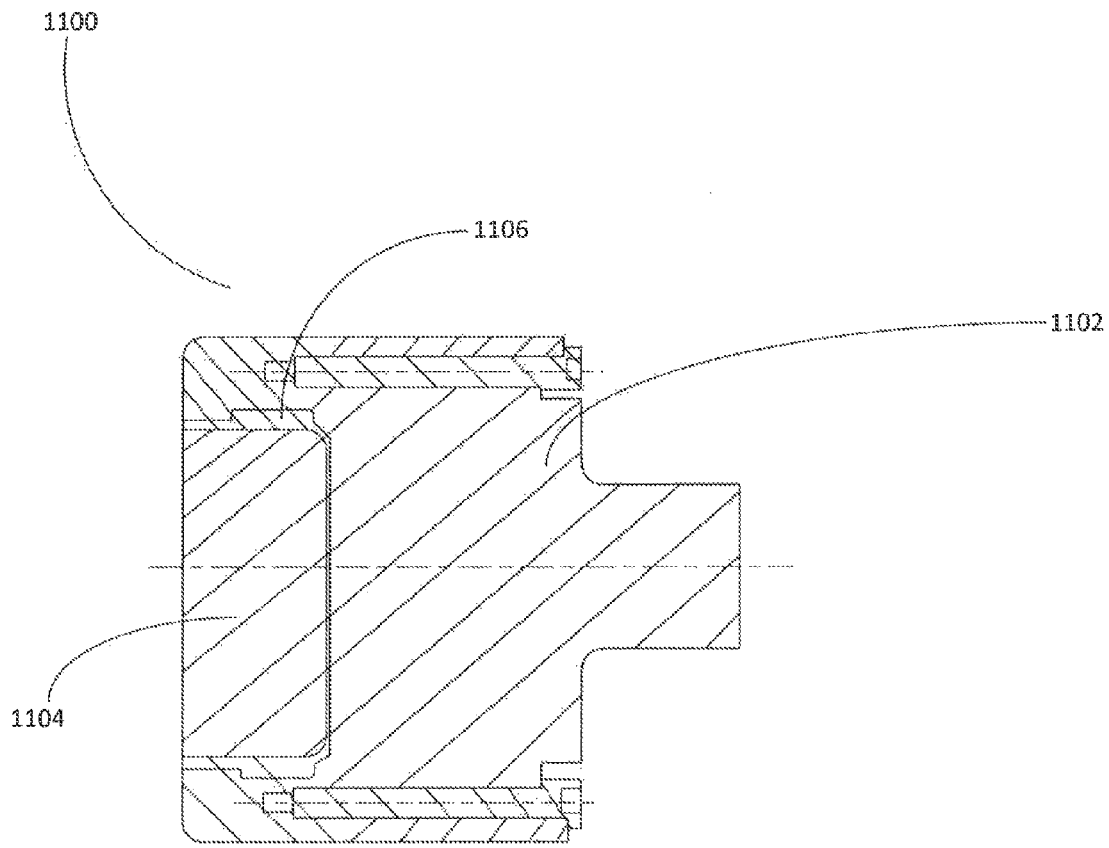
FIG. 11 illustrates a plus head assembly in accordance with various embodiments.

With reference to FIG. 11, plug head assembly 1100 is shown. Ceramic plug head 1104 is shown with thick band 1106. Plug head retainer 1102 retains the ceramic plug head 1104/thick band 1106 system.

In various embodiments, a system is provided comprising a stiff actuator controlled by an actuator control system, wherein the actuator control system comprises a position sensor configured to sense a position of the actuator and a controller configured to apply actuation logic in response to data received from the position sensor, and a plug head assembly comprising a ceramic plug head having a frustoconical geometry, wherein the ceramic plug head has a proximal terminus and a distal terminus, wherein the ceramic plug head has a first coefficient of thermal expansion (GTE), a sleeve having a frustoconical geometry conforming to the ceramic plug head and a second GTE, wherein the second GTE is greater than the first GTE, a distal retainer having a frustoconical geometry conforming to the sleeve, the distal retainer having a first engagement portion for engaging a proximal retainer, the proximal retainer having a second engagement portion for engaging the distal retainer; and a base that receives the proximal retainer, wherein the plug head assembly is coupled to the stiff actuator.

In various embodiments, a system is provided comprising a stiff actuator controlled by an actuator control system, wherein the actuator control system comprises a position sensor configured to sense a position of the actuator and a controller configured to apply actuation logic, in response to data received from the position sensor, and a any plug head assembly as disclosed herein wherein the plug head assembly is coupled to the stiff actuator.

In various embodiments, a system is provided comprising a stiff actuator controlled by an actuator control system, wherein the actuator control system comprises a position sensor configured to sense a position of the actuator and a controller configured to apply actuation logic in response to data received from the position sensor, and a plug head assembly comprising a flat SiC plug head having a circumference, a thick band disposed about the circumference of the flat SiC plug head, wherein the thick band exerts a radial stress upon the flat SiC plug head at a room temperature and at an operating temperature, wherein a probability of survival of the flat SiC plug head under axial thermal expansion stress is greater than 90%, wherein the plug head assembly is coupled to the stiff actuator.

In various embodiments, a system is provided comprising a stiff actuator controlled by an actuator control system, wherein the actuator control system comprises a position sensor configured to sense a position of the actuator and a controller configured to apply actuation logic in response to data received from the position sensor, and a plug head assembly comprising a flat SiC plug head having a circumference, a thick band disposed about the circumference of the flat SiC plug head, wherein the thick band exerts a radial stress upon the flat SiC plug head at a room temperature and at an operating temperature, wherein a probability of survival of the flat SiC plug head under axial thermal expansion stress is greater than 95%, wherein the plug head assembly is coupled to the stiff actuator.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The invention claimed is:

1. A plug head assembly comprising:
   a flat SiC plug head having a circumference;
   a thick band disposed about the circumference of the flat SiC plug head,
   wherein the thick band exerts a radial stress upon the flat SiC plug head at a room temperature and at an operating temperature, wherein the radial stress is from between 800 psi and 8000 psi at the operating temperature, wherein the operating temperature is between 120° F. to 1000° F.,
   wherein a probability of survival of the flat SiC plug head under axial thermal expansion stress is greater than 95%.

2. The plug head assembly of claim 1, wherein the thick band is comprised of a metal and wherein a hoop stress in the thick band resulting from the radial stress at the room temperature is less than the yield strength of the metal.

3. The plug head assembly of claim 2, wherein the radial stress is from between 800 psi and 8000 psi at the operating temperature.

4. The plug head assembly of claim 1, wherein the ceramic plug head does not extend axially beyond the thick band.

5. The plug head assembly of claim 1, wherein the ceramic plug head extends minimally axially beyond the thick band.

6. The plug head assembly of claim 1, wherein the thick band comprises titanium.

7. The plug head assembly of claim 1, wherein the probability of survival
of the flat SiC plug head under axial thermal expansion stress is defined by the equation:

$$Prb(\sigma_{SiC}) = e^{-\frac{V_{SiC}}{V_0} \cdot \left(\frac{\sigma_{SiC}}{\sigma_a}\right)^{m_a}}$$

where $V_{SiC}$ is a volume of the flat SiC plug head, $V_0$ is a volume of a ceramic tests specimen, $\sigma_{SiC}$ is a stress applied to the flat SiC plug head, $\sigma_a$ is a characteristic strength of the flat SiC plug head, and $m_a$ is a Weibull modulus of the flat SiC plug head.

8. The plug head assembly of claim 1, wherein the flat SiC plug head has a residual stress.

9. The plug head assembly of claim 1, the radial stress is between 10% and 40% of the residual stress.

10. A system comprising:
   a stiff actuator controlled by an actuator control system,
   wherein the actuator control system comprises a position sensor configured to sense a position of the actuator and a controller configured to apply actuation logic in response to data received from the position sensor, and
   a plug head assembly comprising:
      a flat SiC plug head having a circumference;
      a thick band disposed about the circumference of the flat SiC plug head,
      wherein the thick band exerts a radial stress upon the flat SiC plug head at a room temperature and at an operating temperature, wherein the radial stress is from between 800 psi and 8000 psi at the operating temperature, wherein the operating temperature is between 120° F. to 1000° F.,
      wherein a probability of survival of the flat SiC plug head under axial thermal expansion stress is greater than 95%,
   wherein the plug head assembly is coupled to the stiff actuator.

* * * * *